UNITED STATES PATENT OFFICE.

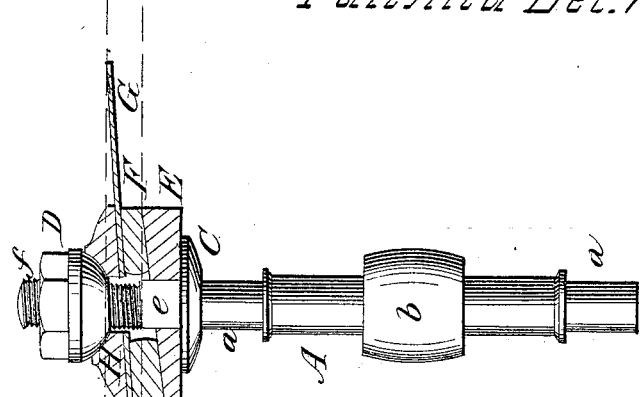
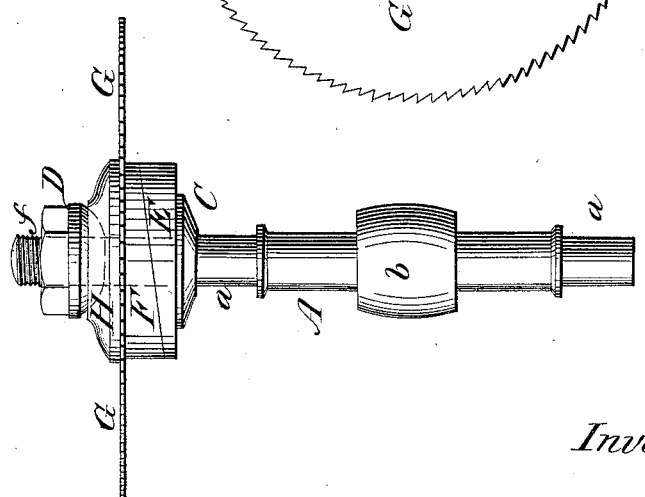

AMOS D. HIGHFIELD, OF PHILADELPHIA, PENNSYLVANIA, ASSIGNOR TO HIMSELF AND WM. H. HARRISON.

METHOD OF ADJUSTING CIRCULAR SAWS OBLIQUELY TO THEIR SHAFTS.

Specification of Letters Patent No. 13,932, dated December 11, 1855.

*To all whom it may concern:*

Be it known that I, AMOS D. HIGHFIELD, of the city of Philadelphia and State of Pennsylvania, have invented a new and Improved Mode of Adjusting Circular Saws on Their Spindles for Cutting Grooves of Various Widths; and I do hereby declare that the following is a full, clear, and accurate description of the same, reference being had to the accompanying drawing and to the letters of reference marked thereon.

My invention consists in securing a circular saw to its spindle in the following manner: Between the saw and a collar on the spindle are two beveled washers, each capable of being turned around independently of the other, and on the opposite side of the saw is a plain washer having a concave recess for receiving a convex nut which screws onto the end of the spindle and secures the saw firmly thereto. The whole is so arranged that by changing the relative positions of the two beveled washers a surface more or less oblique with the axis of the spindle is presented for the saw to be screwed against. Thus the obliquity of the saw with the axis of the spindle may be varied at pleasure and grooves of various widths be cut into the wood submitted to its action.

On reference to the drawing which forms a part of this specification, Figure 1 is a view of the saw and spindle with my improved arrangement of beveled washers, the relative positions of the latter being in this instance such that the face of the saw is at right angles to the spindle. Fig. 2, the same as Fig. 1, but with the washers and saw shown in section and the position of the beveled washers so changed as to present an oblique surface for the saw to be screwed against. Fig. 3 is a face view of the saw, washer, and spindle.

The same letters of reference allude to similar parts throughout the several views.

A is the spindle of which *a a* are the journals and *b* the pulley for receiving the driving strap.

C is a collar forged to and turned perfectly true with the spindle. Beyond this collar the spindle is continued plain as shown at *e* Fig. 2, and the remaining portion is screwed for receiving the nut D. Against the collar C rests the beveled washer E fitting easily on the plain portion *e* of the spindle.

F is a second and similar beveled washer having an orifice somewhat larger than the spindle, against the face of this second washer rests the circular saw G, outside which is a third washer H having a concave recess for receiving the convex end of the nut D.

When the thinnest portion of the edge of the beveled washer E is placed so as to coincide with the thickest portion of the edge of the washer F, the saw will be at right angles to the spindle A as seen in Fig. 1, but when the relative positions of the two washers are changed, the saw becomes more or less oblique with the spindle, the amount of obliquity being regulated by the turning of the washers and consequently the width of the groove cut into the wood, submitted to its action, may be regulated at pleasure.

On the edge of one of the washers I propose to cut a dial, and on the edge of the other a notch acting as a pointer, the several marks on the dial indicating that when moved so as to coincide with the pointer the saw will be at such an angle with the spindle as to cut a groove of a stated width.

I do not desire to claim the exclusive use of oblique circular saws for cutting grooves as such are well known, but What I do claim, and desire to secure by Letters Patent, is—

The employment of two beveled washers between a fixed collar on the spindle, and the circular saw, in the manner and for the purpose specified.

AMOS D. HIGHFIELD.

Witnesses:
THEODORE BERGNER,
WILLIAM E. WALTON.